United States Patent
Yamamoto

(10) Patent No.: US 7,456,857 B2
(45) Date of Patent: Nov. 25, 2008

(54) VIDEOPHONE VIDEO AND AUDIO TRANSFER SYSTEM, MOBILE COMMUNICATION TERMINAL, AND VIDEOPHONE VIDEO AND AUDIO TRANSFER METHOD USED FOR THE SAME

(75) Inventor: Hikaru Yamamoto, Tokyo (JP)

(73) Assignee: NEC Corporation, Tokyo (JP)

(*) Notice: Subject to any disclaimer, the term of this patent is extended or adjusted under 35 U.S.C. 154(b) by 666 days.

(21) Appl. No.: 11/068,974

(22) Filed: Mar. 2, 2005

(65) Prior Publication Data
US 2005/0195273 A1 Sep. 8, 2005

(30) Foreign Application Priority Data
Mar. 3, 2004 (JP) ............................. 2004-058326

(51) Int. Cl.
H04N 7/14 (2006.01)
H04M 1/00 (2006.01)
(52) U.S. Cl. ............... 348/14.02; 348/14.01; 348/14.04
(58) Field of Classification Search ... 348/14.01–14.08, 348/14.09, 14.1, 14.11, 14.12, 14.13, 14.16
See application file for complete search history.

(56) References Cited

U.S. PATENT DOCUMENTS 7,202,885 B2 * 4/2007 Motohashi ............... 348/14.02

2001/0036847 A1 11/2001 Chigira
2002/0092025 A1 7/2002 Klumpp
2003/0045245 A1 3/2003 Hikishima

FOREIGN PATENT DOCUMENTS

| EP | 08883274 A2 | 12/1998 |
|----|----|----|
| JP | 11146366 A | 5/1999 |
| JP | 2000-032421 A | 1/2000 |
| JP | 2000308033 A | 11/2000 |
| JP | 2002027050 A | 1/2002 |
| JP | 2003244315 A | 8/2003 |
| WO | WO 02/43389 A1 | 5/2002 |

* cited by examiner

Primary Examiner—Melur Ramakrishnaiah
(74) Attorney, Agent, or Firm—Sughrue Mion, PLLC

(57) ABSTRACT

The invention provides a mobile communication terminal in which the operating time can be prolonged when the videophone function is used, and a videophone with many persons involved therein can be realized while maintaining the freedom of the movement. A TRX unit receives video and audio data sent from a base station. A radio processing LSI performs the A/D conversion of the video and audio data. A CPU extracts the received video and audio data from a compressed state by use of MPEG or the like, and then outputs the resulting data to a built-in LCD and a built-in loudspeaker. When the data output destination is changed to a Bluetooth control LSI by manipulating operation keys, the built-in LCD and built-in loudspeaker are turned off. By using a Bluetooth TRX unit, the Bluetooth control LSI sends the compressed data through a Bluetooth receiver to an external display and loudspeaker.

12 Claims, 4 Drawing Sheets

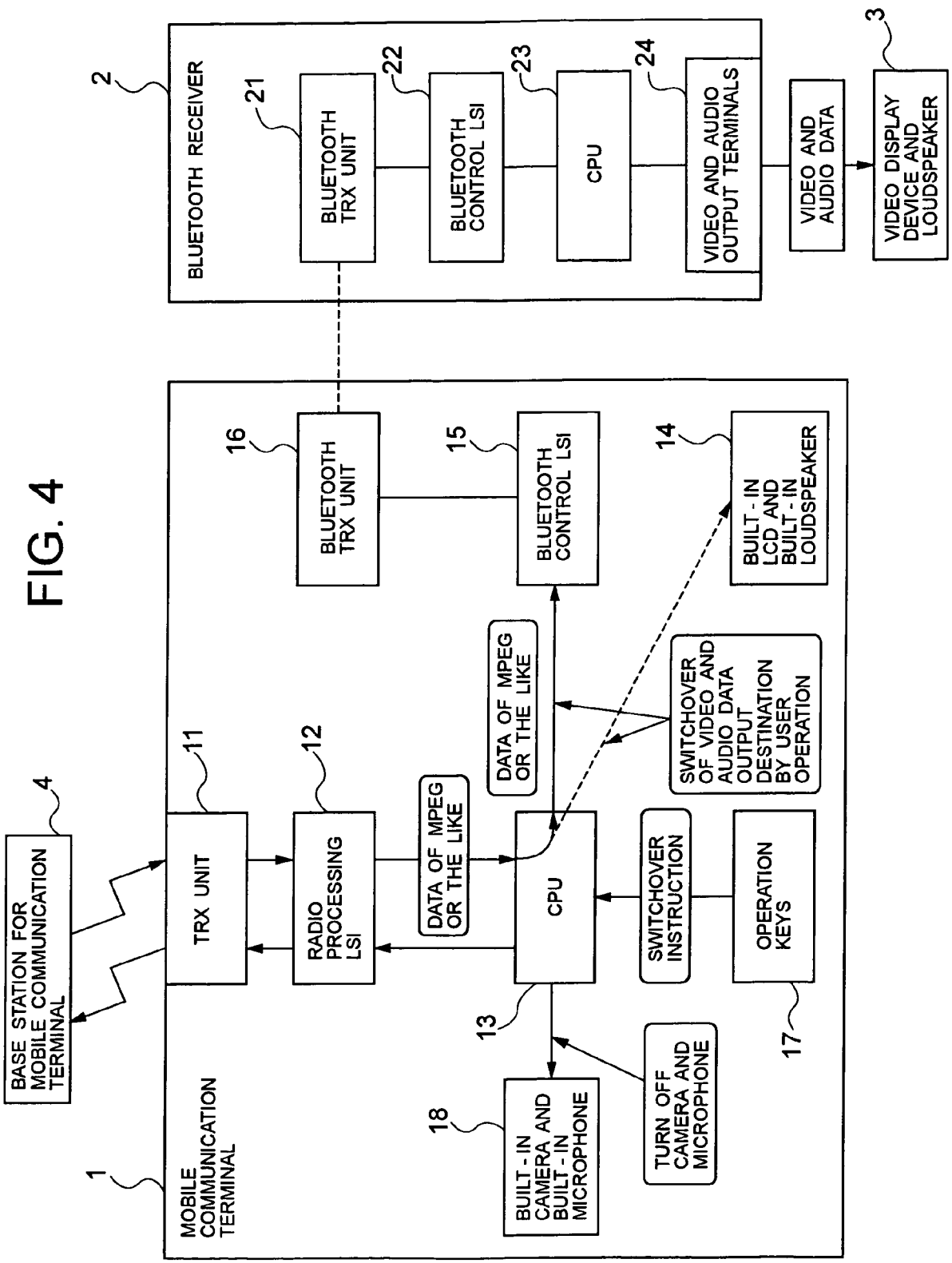

VIDEOPHONE VIDEO AND AUDIO TRANSFER SYSTEM, MOBILE COMMUNICATION TERMINAL, AND VIDEOPHONE VIDEO AND AUDIO TRANSFER METHOD USED FOR THE SAME

BACKGROUND OF THE INVENTION

1. Field of the Invention

The present invention relates to a videophone video and audio transfer system, a mobile communication terminal, and a videophone video and audio transfer method used for the same, and more particularly to a videophone video and audio transfer method used in mobile communication terminals.

2. Description of the Related Art

In recent years, with a mobile communication terminal equipped with an imaging device, such as a CCD (Charge Coupled Device) and a CMOS (Complementary Metal Oxide Semiconductor), still images or moving images can be captured, and a videophone call can be made (refer to Japanese Patent Laid-Open No. 2000-032421, for example).

In a mobile communication terminal according to conventional art, images captured with the above described imaging device and sounds picked up with a microphone are transmitted as videophone video and audio to a call destination, and at the same time, videophone video and audio received from the call destination can be outputted only through a built-in LCD (Liquid Crystal Display) and built-in loudspeaker.

In the mobile communication terminal according to conventional art, however, much power is consumed to display images on the built-in LCD. Consequently, a call state cannot be maintained for a long time, thereby causing a problem.

Also, in the mobile communication terminal according to conventional art, its built-in LCD is small. Thus, it is impossible for many persons to view the videophone images.

In the mobile communication terminal according to conventional art, when the videophone function is used, more current is consumed by using the videophone video display unit as compared with when only the call function is used. Thus, the use of videophone function leads to a significantly reduced communicatable time.

Also, in the mobile communication terminal according to conventional art, it is supposed that videophone is used for videoconference, etc. However, with the display unit mounted on the mobile communication terminal, the image size of persons, etc. is too small to be used for a case in which a large range must be displayed, such as a conference held by many people, thus limiting the application of the videophone.

The solutions to this problem include a wired power supply and a wired video and audio transfer. However, these methods can reduce the freedom of movement, which is one feature of a mobile communication terminal.

SUMMARY OF THE INVENTION

An object of the present invention is to provide a videophone video and audio transfer system, a mobile communication terminal, and a videophone video and audio transfer method used for the same, which can prolong the operating time for videophone function and can implement a videophone with many persons involved therein while maintaining the freedom of movement.

A videophone video and audio transfer system according to the invention includes a mobile communication terminal which has a videophone function and internal output means outputting video and audio data obtained by the videophone function, the mobile communication terminal including transfer means transferring the video and audio data obtained by the videophone function to an external output device by use of short range wireless communication.

A mobile communication terminal according to the invention includes a videophone function and internal output means outputting video and audio data obtained by the videophone function, and comprises transfer means transferring the video and audio data obtained by the videophone function to an external output device by use of short range wireless communication.

A videophone video and audio transfer method according to the invention is used for transferring video and audio data obtained by a videophone function in a videophone video and audio transfer system including a mobile communication terminal which has the videophone function and internal output means outputting the video and audio data obtained by the videophone function, and comprises a step of transferring the video and audio data obtained by the videophone function from the mobile communication terminal to an external output device by use of short range wireless communication.

Specifically, in the videophone video and audio transfer system according to the invention, the mobile communication terminal has a function of wirelessly transferring video and audio to the external output device when the videophone is used.

More specifically, in the videophone video and audio transfer system according to the invention, the mobile communication terminal can simultaneously send and receive videophone video and audio to/from another mobile communication terminal or fixed communication terminal via a base station.

The videophone video and audio received by the mobile communication terminal is supplied via a Bluetooth receiver to the external output device. Also, image data captured with the mobile communication terminal and audio data picked up with the same are sent to another mobile communication terminal or fixed communication terminal.

As described above, in the videophone video and audio transfer system according to the invention, since video and audio data are transferred by use of Bluetooth technology, the transfer of video and audio to the external output device can be wirelessly performed.

Accordingly, in the videophone video and audio transfer system according to the invention, received images being conventionally displayed on the display unit of the mobile communication terminal are displayed on the external output device, thereby eliminating the power being conventionally consumed in the display unit, including an LCD (Liquid Crystal Display) and an LCD backlight, to increase communication time. Also, the external output device with a large screen is also applicable to the display of videoconference images, etc.

As the means for transferring images to the external output device, the videophone video and audio transfer system according to the invention employs wireless communication by Bluetooth technology. The advantages for the use of Bluetooth technology include wireless connection, low power consumption, and security obtained by encryption, which are most suitable for the implementation of the invention. In addition, many Bluetooth-enabled mobile communication terminals are already commercially available. With this function of the conventional mobile communication terminals, no hardware modification is required in the mobile communication terminal side, which is also one advantage for the use of Bluetooth technology.

Accordingly, in the videophone video and audio transfer system according to the invention, the power of LCD and LCD backlight is off during videophone call, whereby current consumption can be significantly reduced during videophone call Also, in the videophone video and audio transfer system according to the invention, images are displayed on the external output device, whereby many persons can simultaneously view the images during the videophone call.

Also, in the videophone video and audio transfer system according to the invention, data is wirelessly transferred to the external output device. Accordingly, the mobile communication terminal can be moved freely so that the subject can be shot from an arbitrary angle and position.

According to the invention, there can be obtained advantageous effects such that the operating time can be prolonged when the videophone function is used, and that a videophone with many persons involved therein can be realized.

BRIEF DESCRIPTION OF THE DRAWINGS

FIG. 4 is a block diagram for explaining an another operation of the mobile communication terminal and Bluetooth receiver shown in FIG. 1.

DETAILED DESCRIPTION OF THE PREFERRED EMBODIMENTS

Figure 1:
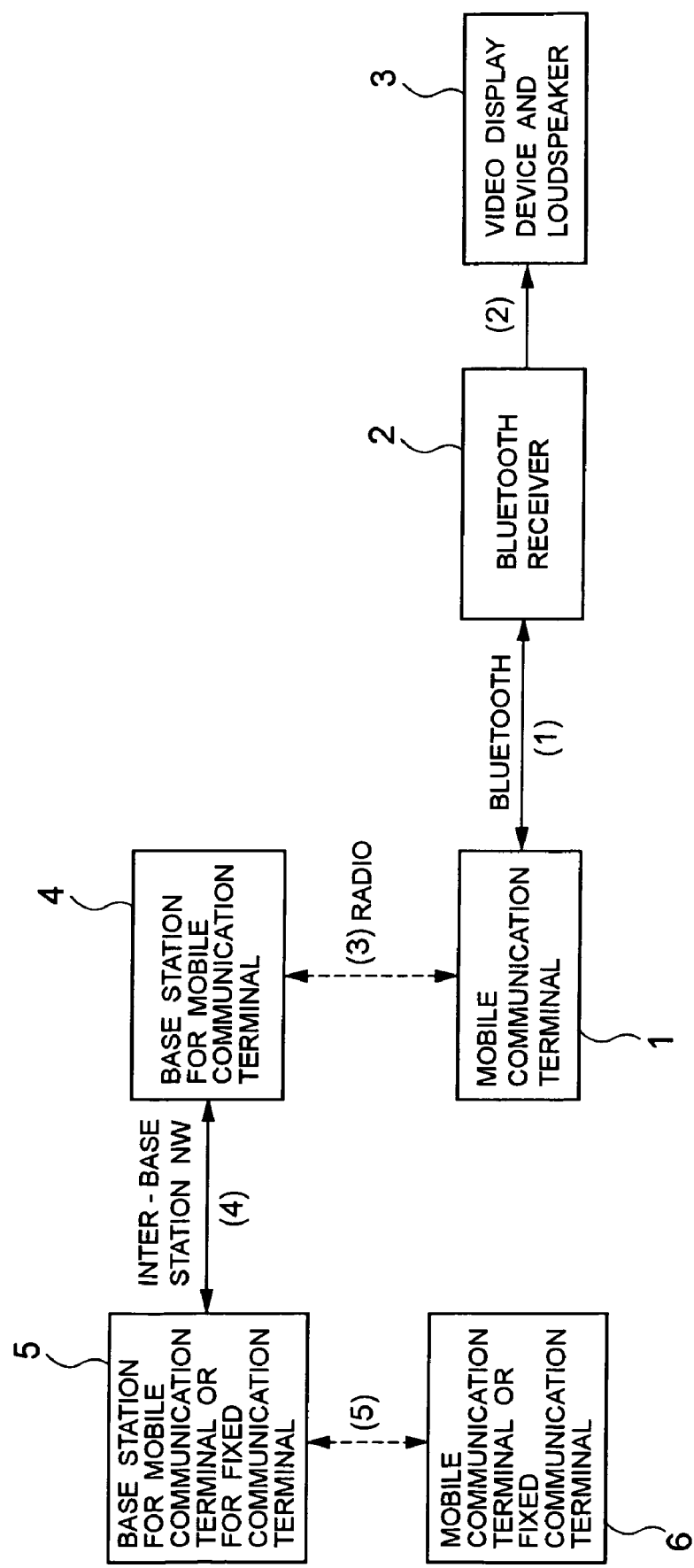
FIG. 1 is a block diagram showing a configuration of a videophone video and audio transfer system according to an embodiment of the invention.

An embodiment of the invention will now be described with reference to the drawings. FIG. 1 is a block diagram showing a configuration of a videophone video and audio transfer system according to an embodiment of the invention. Referring to FIG. 1, the videophone video and audio transfer system according to the embodiment of the invention includes: a mobile communication terminal 1; a Bluetooth receiver 2; a video display device and loudspeaker 3 (hereinafter referred to as an external output device); a base station 4 for the mobile communication terminal 1; a base station 5 for a fixed communication terminal or for a mobile communication terminal; and the mobile communication terminal or the fixed communication terminal 6 (hereinafter referred to as another terminal device).

The connection between the mobile communication terminal 1 and the Bluetooth receiver 2 is via Bluetooth transmission (1). The connection between the Bluetooth receiver 2 and the external output device 3 is via wired transmission (2).

The connection between the mobile communication terminal 1 and the base station 4 is via wireless transmission (3). The connection between the base stations 4 and 5 is via inter-base station NW (NetWork) (4). The connection between the base station 5 and another terminal device 6 is via wireless or wired transmission (5).

Between the mobile communication terminal 1 and another terminal device 6, videophone video and audio can be simultaneously sent and received via the base stations 4 and 5. The mobile communication terminal 1 outputs the received videophone video and audio to the external output device 3 via the Bluetooth receiver 2. Image data captured with the mobile communication terminal 1 and audio data picked up with the same are sent to the base station 4, and then are received via the base station 5 by another terminal device 6.

As described above, according to the embodiment, video and audio data are transferred to the external output device 3 by using Bluetooth transmission. Accordingly, the transfer of video and audio data to the external output device 3 can be performed wirelessly.

According to the embodiment, in order to solve the above described problems, received images being conventionally displayed on the display unit of a mobile communication terminal are displayed on the external output device 3, whereby the power being conventionally consumed in the videophone video display unit (not shown), including an LCD (Liquid Crystal Display) and an LCD backlight can be reduced to thereby increase communication time. At the same time, the external output device 3 with a large screen is also applicable to the display of videoconference images, etc.

Also, according to the embodiment, as the means for transferring images to the external output display 3, short range wireless transmission by use of Bluetooth technology [the other applicable wireless transmission standards includes IEEE (Institute of Electrical and Electronic Engineers) 802.11a, 802.11b, 802.11g] is employed. The advantages for the use of Bluetooth technology include wireless connection, low power consumption, and security obtained by encryption, which are most suitable for the implementation of the invention.

In addition, many Bluetooth-enabled mobile communication terminals are already commercially available. With this function of the conventional mobile communication terminals, no hardware modification is required in the mobile communication terminal side, which is also one advantage for the use of Bluetooth technology.

Figure 2:
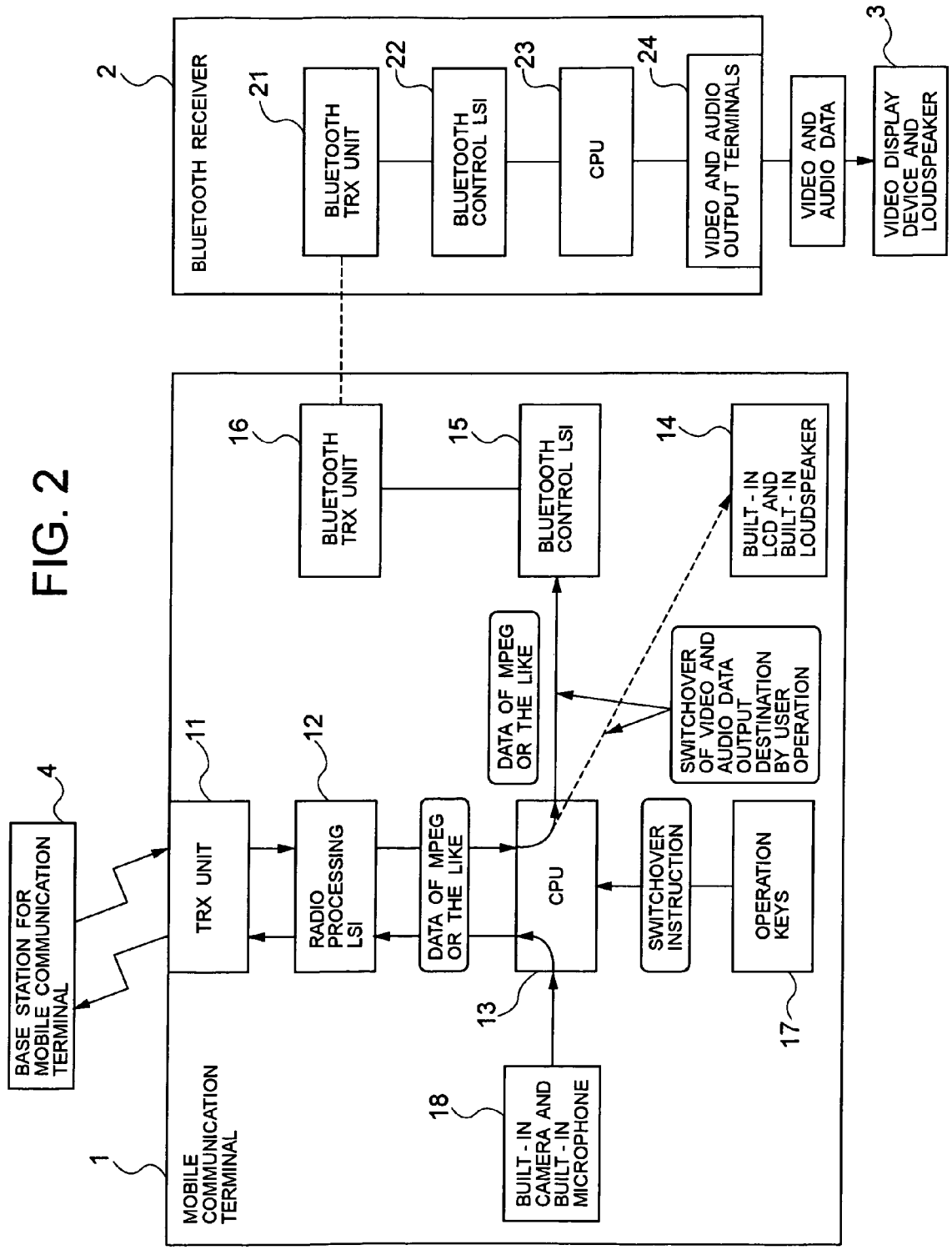
FIG. 2 is a block diagram showing a configuration of a mobile communication terminal and Bluetooth receiver shown in FIG. 1.

FIG. 2 is a block diagram showing a configuration of the mobile communication terminal 1 and Bluetooth receiver 2 shown in FIG. 1. Referring to FIG. 2, the mobile communication terminal 1 includes a TRX (transmission and reception) unit 11, radio processing LSI (large-scale integrated circuit) 12, a CPU (central processing unit) 13, a built-in LCD and a built-in loudspeaker 14, a Bluetooth control LSI 15, a Bluetooth TRX unit 16, operation keys 17, and a built-in camera and a microphone 18, and is connected via the TRX unit 11 to the base station 4 by wireless.

The Bluetooth receiver 2 includes a Bluetooth TRX unit 21, a Bluetooth control LSI 22, a CPU 23, and video and audio output terminals 24, and is connected via wired transmission to the external output device 3.

The TRX unit 11 receives video and audio data sent from the base station 4. The data received by the TRX unit 11 is of analog format. The radio processing LSI 12 performs the A/D (analog to digital) conversion of the video and audio data, and then sends the digital video and audio data to the CPU 13.

Ordinarily, the video and audio data received by the CPU 13 are extracted from a compressed state by use of MPEG (Moving Pictures Experts Group) or the like, and then are outputted to the built-in LCD and built-in loudspeaker 14. In the embodiment, however, the data output destination can be changed to the Bluetooth control LSI 15 by the user operating the operation keys 17. In this case, the built-in LCD and built-in loudspeaker 14 are turned off.

Unlike when being sent to the built-in LCD and built-in loudspeaker 14, the video and audio data sent to the Bluetooth control LSI 15 are directly transmitted as MPEG (or other encoding)-compressed data.

The Bluetooth control LSI 15 sends the data by using the Bluetooth TRX unit 16 incorporated into the mobile communication terminal 1. The sent data are received by the Bluetooth TRX unit 21 incorporated into the Bluetooth receiver 2.

The data received by the TRX unit 21 are supplied to the Bluetooth control LSI 22, and then are sent to the CPU 23 incorporated into the Bluetooth receiver 2. The CPU 23 has the functions of processing the video and audio data and of outputting the video and audio signals to the external output device 3, which functions are similar to those of the CPU 13 incorporated into the mobile communication terminal 1, and outputs the video and audio data to the external output device 3 via the video and audio output terminals 24.

In the mobile communication terminal 1, irrespective of which output destination is selected, images and sounds are inputted with the built-in camera and built-in microphone 18, and then supplied to the CPU 13 as data. The CPU 13 compresses the received data in MPEG or other encoding format, and then supplies the resulting data to the radio processing LSI 12. After being subjected to the D/A (digital to analog) conversion, the above data are sent to the base station 4 by using the TRX unit 11.

Figure 3:
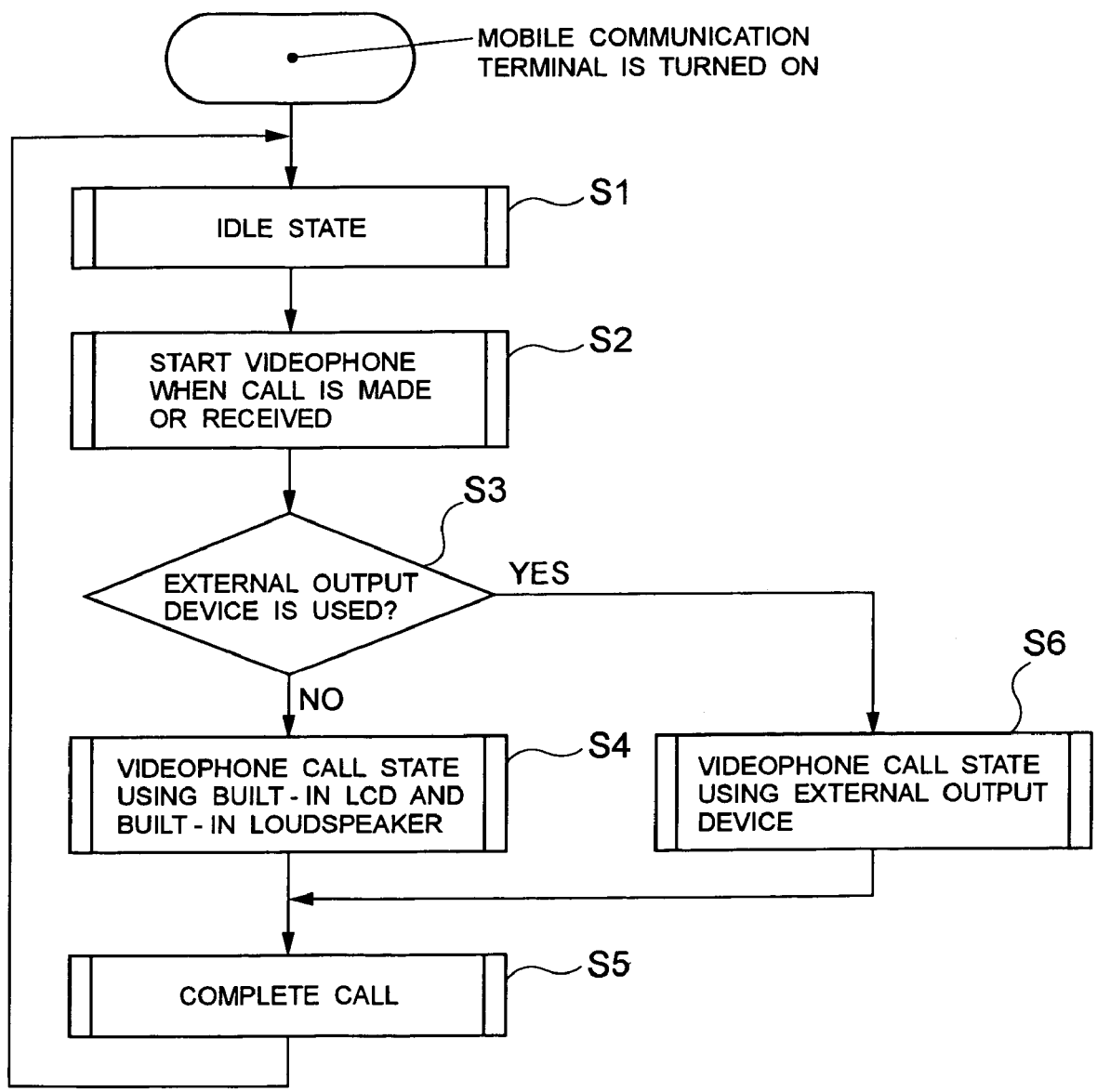
FIG. 3 is a flowchart showing an operation of the mobile communication terminal shown in FIG. 2.

FIG. 3 is a flowchart showing an operation of the mobile communication terminal 1 shown in FIG. 2. An operation of the mobile communication terminal 1 according to the embodiment of the invention will now be described with reference to FIGS. 1 to 3.

When the mobile communication terminal 1 is turned on, it enters an idle state (step S1 of FIG. 3). When the user gives an instruction to start the videophone by operating the keys 17 during this idle state, the mobile communication terminal 1 proceeds, in response to the user operating the operation keys 17, either to the videophone call state using the built-in LCD and built-in loudspeaker 14 or to the videophone call state using the external output device 3 (steps S2 to S4 and step S6 of FIG. 3).

In both the videophone call state using the built-in LCD and built-in loudspeaker 14 and the videophone call state using the external output device 3, the mobile communication terminal 1 can finish the videophone call state and then return to the idle state.

In this way, according to the embodiment, the power of the LCD and LCD backlight of the built-in LCD and built-in loudspeaker 14 is off during videophone call, whereby current consumption can be significantly reduced during the videophone call.

Also, according to the embodiment, images are displayed on the external output device 3 during videophone call, whereby many persons can simultaneously view the videophone images through the external output device 3.

Also, according to the embodiment, video and audio data are transferred wirelessly to the external output device 3, whereby the mobile communication terminal 1 can be moved freely so that the subject can be shot from an arbitrary angle and position.

FIG. 4 is a block diagram for explaining an another operation of the mobile communication terminal 1 and Bluetooth receiver 2 shown in FIG. 1. According to the operation in FIG. 4, power consumption can be further reduced.

Referring to FIG. 4, in the mobile communication terminal 1, the built-in camera and built-in microphone 18 are in an OFF state. Accordingly, the power consumption of the built-in camera and built-in microphone 18 is reduced.

In addition, when the transfer destination of video data is set to the Bluetooth control LSI 15, all that the CPU 13 must perform is the transfer of video data and the control of the radio processing LSI 12. Thus, the operation clock frequency of the CPU 13 can be lowered, whereby the power consumption of the CPU 13 itself can be reduced.

In FIG. 4, there is no video transmission from the mobile communication terminal 1. Thus, when the base station 4 can perform transmission to plural mobile communication terminals, the reception side may include plural mobile communication terminals.

In FIG. 4, Bluetooth is employed for short range wireless transmission. However, as mentioned above, it is also possible to use a short range wireless transmission according to IEEE 802. 11a, 802. 11b, 802. 11g, etc.

What is claimed is:

1. A videophone video and audio transfer system comprising a mobile communication terminal which has a videophone function and internal output means outputting video and audio data obtained by the videophone function, wherein the mobile communication terminal has transfer means for transferring the video and audio data obtained by the videophone function to an external output device by use of short range wireless communication, wherein the mobile communication terminal includes means for cutting the power supply to the internal output means when the video and audio data are transferred to the external output device by the transfer means.

2. The videophone video and audio transfer system according to claim 1, wherein:

the mobile communication terminal includes an imaging device for capturing images and an input device for picking up sounds; and in the mobile communication terminal, the power supply to the imaging device and input device is cut when the video and audio data are transferred to the external output device by the transfer means.

3. The videophone video and audio transfer system according to claim 1, wherein the internal output means and the external output device each include a display for displaying the video data and a loudspeaker for outputting the audio data.

4. The videophone video and audio transfer system according to claim 1, wherein the short range wireless communication is a Bluetooth.

5. A mobile communication terminal comprising:

a videophone function and internal output means for outputting video and audio data obtained by the videophone function;

transfer means for transferring the video and audio data obtained by the videophone function to an external output device by use of short range wireless communication; and means for cutting the power supply to the internal output means when the video and audio data are transferred to the external output device by the transfer means.

6. The mobile communication terminal according to claim 5, including an imaging device for capturing images and an input device for picking up sounds, wherein the power supply to the imaging device and input device is cut when the video and audio data are transferred to the external output device by the transfer means.

7. The mobile communication terminal according to claim 5, wherein the internal output means and the external output device each include a display for displaying the video data and a loudspeaker for outputting the audio data.

8. The mobile communication terminal according to claim 5, wherein the short range wireless communication is a Bluetooth.

9. A videophone video and audio transfer method in a videophone video and audio transfer system comprising a mobile communication terminal which has a videophone function and internal output means outputting video and audio data obtained by the videophone function, said method comprising:

a step of transferring the video and audio data obtained by the videophone function from the mobile communication terminal to an external output device by use of short range wireless communication; and a step of cutting the power supply to the internal output means when the video and audio data are transferred to the external output device.

10. The videophone video and audio transfer method according to claim 9, wherein:

the mobile communication terminal includes an imaging device for capturing images and an input device for picking up sounds: and in the mobile communication terminal, the power supply to the imaging device and input device is cut when the video and audio data are transferred to the external output device.

11. The videophone video and audio transfer method according to claim 9, wherein the internal output means and the external output device each include a display for displaying the video data and a loudspeaker for outputting the audio data.

12. The videophone video and audio transfer method according to claim 9, wherein the short range wireless communication is a Bluetooth.

* * * * *